United States Patent
Laframboise et al.

(10) Patent No.: US 8,398,114 B2
(45) Date of Patent: Mar. 19, 2013

(54) VEHICULAR TRIM APPLICATIONS USING FILM ADHESIVE IN LIEU OF STITCHING

(75) Inventors: Gregg Laframboise, Windsor (CA); David Thimm, Plymouth, MI (US); Richard P. Doerer, Royal Oak, MI (US); Daniel J. Koester, Ann Arbor, MI (US); Marie R. Howell, South Lyon, MI (US); Sandra L. Smith, Waterford, MI (US); Jeffrey Suiter, Taylor, MI (US); Teresa A. Stapleton, Canton, MI (US); Duane Potes, Jr., Adrian, MI (US)

(73) Assignee: Johnson Controls Technology Company, Holland, MI (US)

(*) Notice: Subject to any disclaimer, the term of this patent is extended or adjusted under 35 U.S.C. 154(b) by 84 days.

(21) Appl. No.: 12/934,351

(22) PCT Filed: Mar. 25, 2009

(86) PCT No.: PCT/US2009/038200
§ 371 (c)(1),
(2), (4) Date: Oct. 30, 2010

(87) PCT Pub. No.: WO2009/120754
PCT Pub. Date: Oct. 1, 2009

(65) Prior Publication Data
US 2011/0037243 A1 Feb. 17, 2011

Related U.S. Application Data

(60) Provisional application No. 61/039,229, filed on Mar. 25, 2008.

(51) Int. Cl.
*B60R 21/16* (2006.01)
(52) U.S. Cl. .................................. 280/730.2; 280/728.3
(58) Field of Classification Search ............... 280/730.2, 280/728.3
See application file for complete search history.

(56) References Cited

U.S. PATENT DOCUMENTS

| 6,045,151 | A | 4/2000 | Wu | |
| 7,669,889 | B1 * | 3/2010 | Gorman et al. | 280/730.2 |
| 2005/0258624 | A1 * | 11/2005 | Abraham et al. | 280/728.3 |
| 2007/0084559 | A1 | 4/2007 | Graziano | |
| 2010/0295282 | A1 * | 11/2010 | Kim et al. | 280/730.2 |
| 2011/0041296 | A1 * | 2/2011 | Dono et al. | 24/391 |
| 2011/0193327 | A1 * | 8/2011 | Tracht et al. | 280/728.2 |

FOREIGN PATENT DOCUMENTS

JP 2004298641 A * 10/2004

* cited by examiner

Primary Examiner — Faye M. Fleming
(74) Attorney, Agent, or Firm — Dickinson Wright PLLC

(57) ABSTRACT

A vehicle seat configured to retain an air bag. The vehicle seat uses selective use of adhesive tape in place of stitching to provide easier manufacturing, lower cost, improved durability and easier repairs, as well as having the adhesive tape be configured to rupture as needed in response to activation of the air bag.

18 Claims, 17 Drawing Sheets

VEHICULAR TRIM APPLICATIONS USING FILM ADHESIVE IN LIEU OF STITCHING

CROSS REFERENCE TO RELATED APPLICATION

This U.S. National Stage patent application claims the benefit of PCT Patent Application International Serial No. PCT/US2009/038200 filed on Mar. 25, 2009, entitled "Vehicular Trim Applications Using Film Adhesive In Lieu Of Stitching," and U.S. Provisional Patent Application Ser. No. 61/039,229 filed on Mar. 25, 2008, entitled "Vehicular Trim Applications Using Film Adhesive In Lieu Of Stitching," the entire disclosures of the applications being considered part of the disclosure of this application and hereby incorporated by reference.

TECHNICAL FIELD

The present invention relates to a vehicle seat that is capable of retaining an air bag and more particularly to a vehicle seat that selectively uses an adhesive tape in conjunction with the air bag to control ruptures to the tape and surface material of the seat as well as provide enhanced durability, lower manufacturing and assembly costs, and easier and lower cost repairs after deployment of an air bag.

BACKGROUND

Vehicle seats commonly include side air bags to reduce the injury to an occupant of the seat in the event of a side impact. More specifically, an air bag within the seat is inflated in the event of a side impact to a vehicle in a magnitude that is above a predetermined threshold. The air bag is stored in a deflated condition, together with an inflator, in a cavity in the vehicle seat and is configured to exit the seat on the side adjacent to the side structure of the vehicle, such as a door, window or body panel of the vehicle. In the event of a side impact, the air bag is inflated into a position between the vehicle occupant in the vehicle seat and the adjacent side structure of the vehicle. The air bag provides a cushion to reduce potential injury to the occupant.

The vehicle seat is generally includes a frame surrounded by a cushion or foam portion, which in turn is covered with a surface material. The surface material is traditionally stitched with a variety of seams, many of which are chosen for the design effect. Some of the seams are limited to specific locations, such as one seam being particularly limited due to requirement that the air bag rupture the seam during activation. Therefore, vehicle designers have been limited in placement of the side seams in view of requirements for air bags. The air bags generally use seams for controlled ruptures with the stitching or thread bursting in a controlled manner to both direct the air bag, as well as provide a weak area, such that the air bag does not inflate within the seat. In addition to location of the seams, the designers have been limited in using stitching or thread to provide desired longevity while also allowing for controlled rupturing of areas of seams.

SUMMARY OF THE INVENTION

The present invention relates to a vehicle seat that is capable of retaining an air bag and more particularly to a vehicle seat that selectively uses an adhesive tape in conjunction with the air bag to control ruptures to the tape and surface material of the seat as well as provide enhanced durability, lower manufacturing and assembly costs, and easier and lower cost repairs after deployment of an air bag.

The seat includes an air bag, and uses cushions to define a shape with an opening in the cushions to allow the passage of the air bag. A surface material having a finish surface and an opposed inner surface covers the cushions and includes a seam, free from stitching, extending along said opening in the cushions. The seam includes a taped adhesive bonding a first portion of surface material to a second portion of surface material proximate to the opening.

The taped adhesive for seat seams generally comprises a first bonding surface and a second opposed bonding surface and a weakened area capable of rupturing on the bonding portions. The weakened area may be perforated to create the weakness. The areas proximate to the circumferential extent may be strengthened or free from the weakened area to limit rupturing of the taped adhesive to a specified extent within the weakened area.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
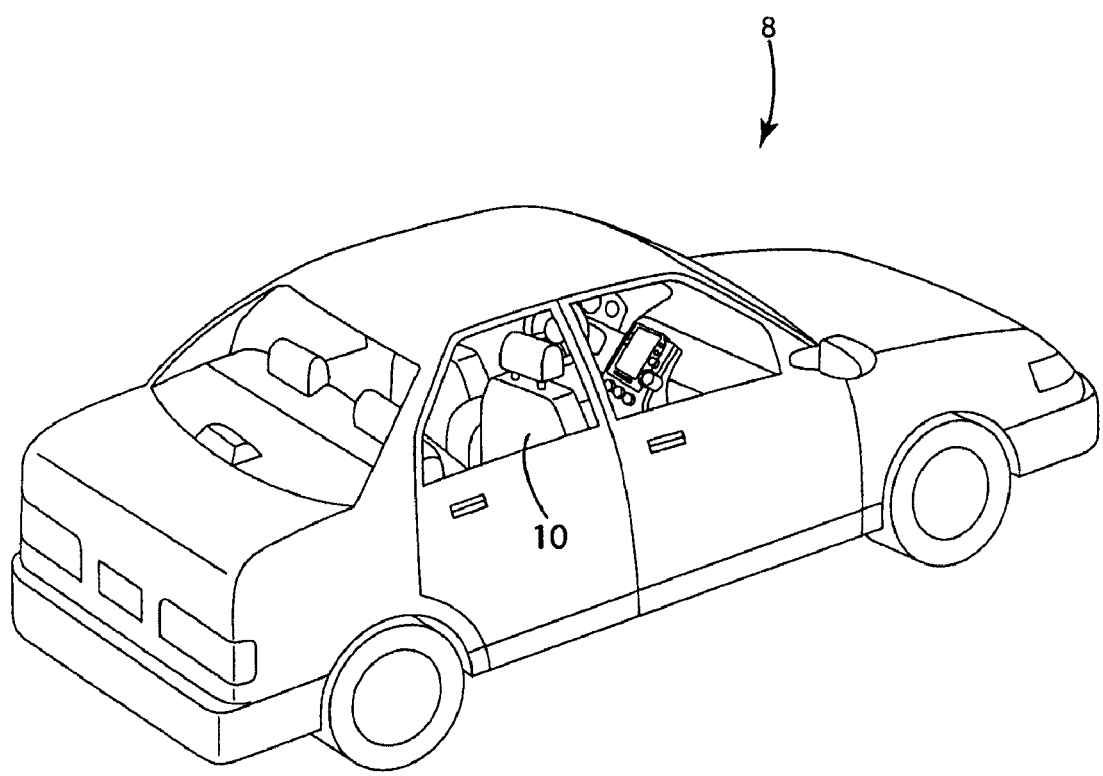
FIG. 1 is a perspective view of a vehicle.

The present invention as illustrated in the Figures relates to a seat 10 for a vehicle 8 that is capable of retaining an air bag 20. The seat 10 includes a cushion portion 30 that generally defines the shape of the seat 10 and is covered by a surface material 40. To conform the surface material 40 to the shape of the seat 10, generally a variety of seams 52 must be used. The seat 10 selectively uses an adhesive tape 70 in conjunction with the air bag 20 to control ruptures to the tape 70 and surface material 40 of the seat 10 as well as provide enhanced durability, lower manufacturing and assembly costs, and easier and lower cost repairs after activation of an air bag 20.

Figure 12:
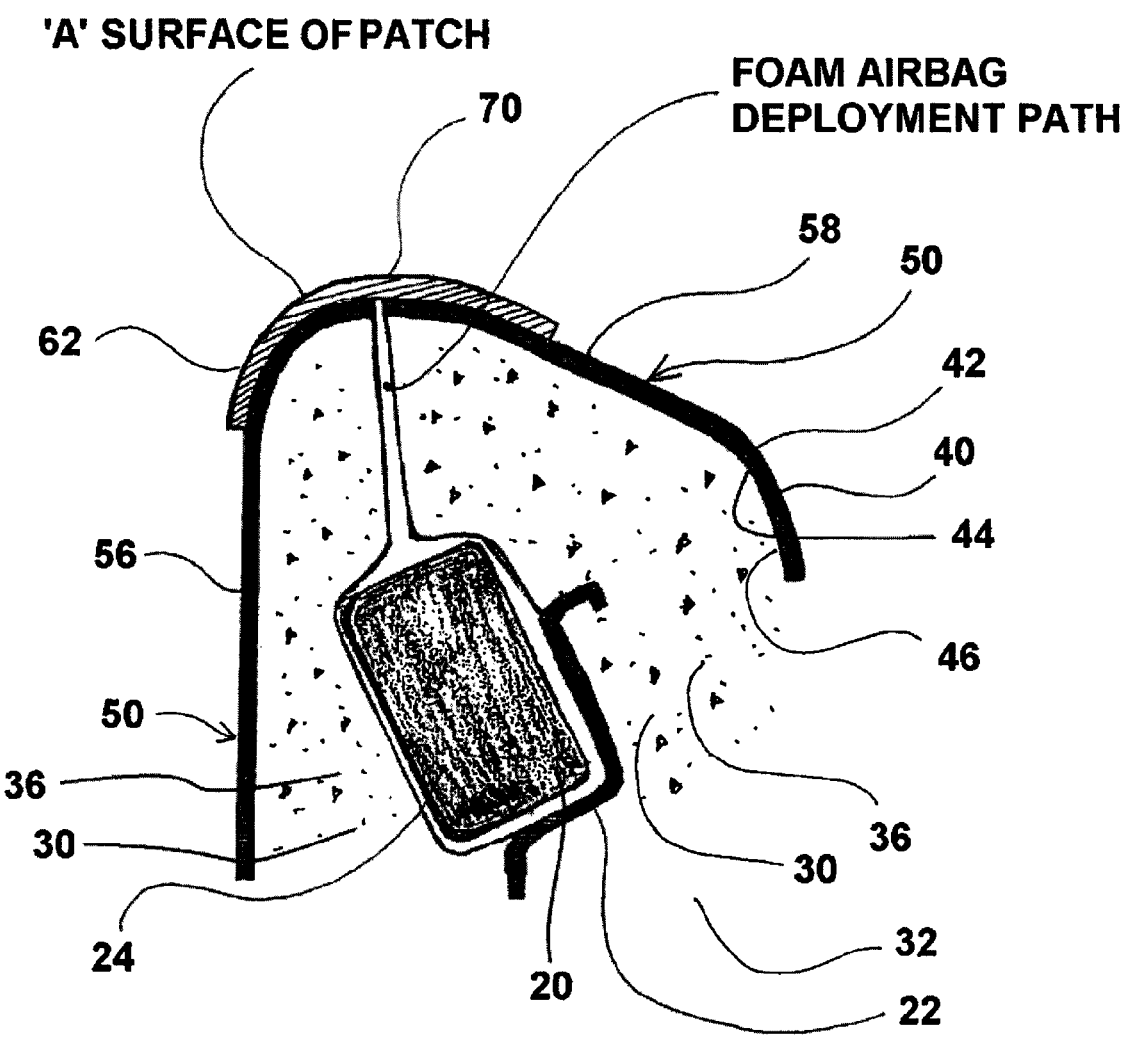
FIG. 12 is partial sectional view of an exemplary seat.

Although the Figures illustrate an exemplary front passenger seat 10, the present invention may be used with any seat in the vehicle in which it is desirable to place an air bag to cushion against side impacts or provide protective curtains. The seat 10 generally includes a frame (not illustrated) which allows it to be attached securely to the vehicle 8 and provides the structural support of the seat 10. The cushion portion 30 is applied around the frame with the shape of the individual cushions 36 further forming the desired design shape of the seat. The cushions 36 may be formed from any material desirable for use in seats. As illustrated in FIG. 12, the cushions generally define a cavity 32 into which the air bag 20, in a non-deployed state is secured. An opening or passage 34 generally extends between the cushions 36.

An exemplary air bag 20 is illustrated in a non-deployed position in FIG. 12. The air bag 20 generally includes a diffuser 22 to help direct the bag portion 24 as it is being inflated through the opening or passage 34, generally referred in the industry as the deployment path.

The surface material 40 may be any desirable material to surface seats, such as leather and cloth. The surface material 40 typically includes a finish surface 42, which is visible to the occupant of the vehicle 8 and an opposed inner surface 44. Many surface materials 40 are formed from at least two layers (not illustrated), with the outer layer forming the finish surface and a backing (not illustrated) forming the inner layer. The surface material 40 may be formed from a contoured material to minimize seams, but more typically is formed in panels 50 interconnected by seams 52. These seams 52 may include stitching, and are generally used to join a first adjoining portion 56 and a second adjoining portion 58. The first and second adjoining portions 56, 58 may be formed out of single panel 50 or may be the joining of multiple panels 50. The panels 50 and seams 52 may be used to help shape or accent the contours and design of the seat 10. The seams 52 may also be required to be functionally located in certain positions, such as in the prior art, the stitched seam that runs along the opening 34 in the cushion portion 30. The use of the seam 52 allows for controlled rupturing of the seam 52 to ensure that the air bag reliably exits the cavity 32 in the seat and does not deploy within the seat. The required functional location of the seam 52 limits the designer's abilities to differentiate seats between vehicle manufacturers.

The use of the taped adhesive 70 of the present invention allows for both stitch free seams, yet allows the seam to rupture under specified circumstances. The taped adhesive 70 is generally formed in a variety of sizes and shapes to confirm to the desired seat shape, seam location, length, and contours. As illustrated in the Figures, the taped adhesive 70 generally includes a first bonding surface 72 and a second bonding surface 74 that is opposed to the first bonding surface 72. The taped adhesive generally includes a longitudinal extent 76 and a lateral extent 78.

Figure 3:
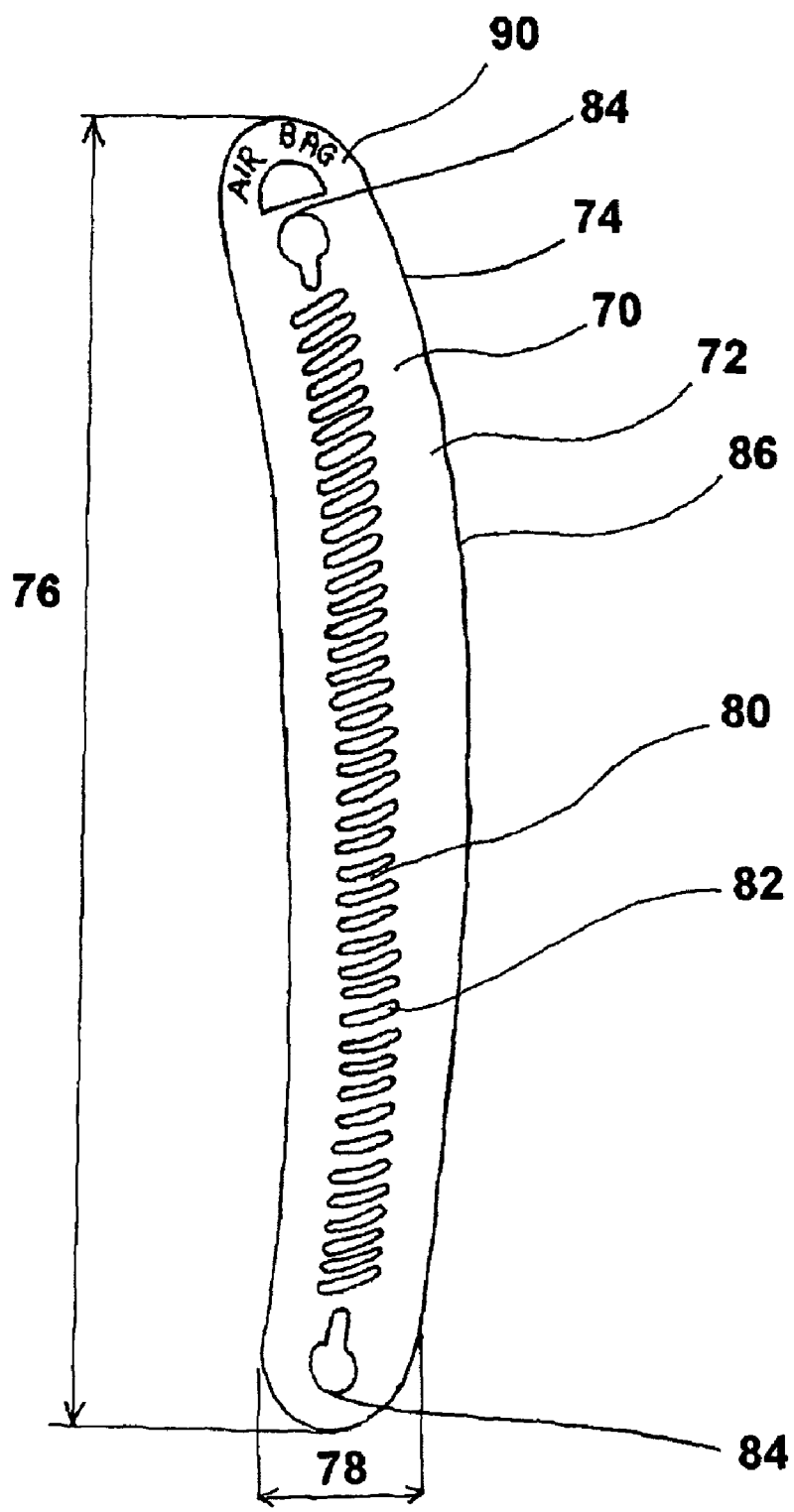
FIG. 3 is a perspective view of an exemplary adhesive tape including an optional identification tag.
Figure 4:
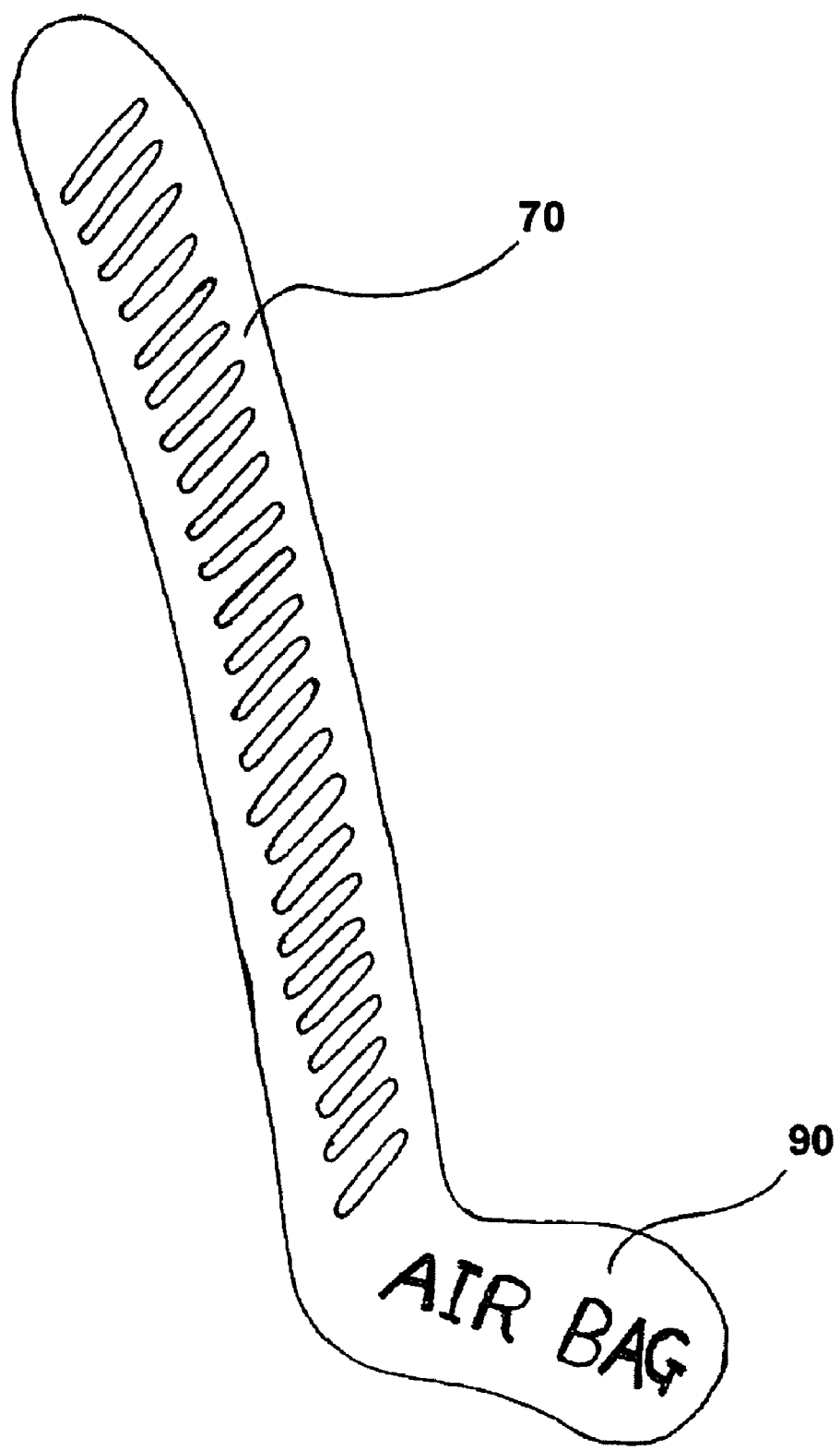
FIG. 4 is a perspective view of a second exemplary adhesive tape including an optional identification tag.
Figure 5:
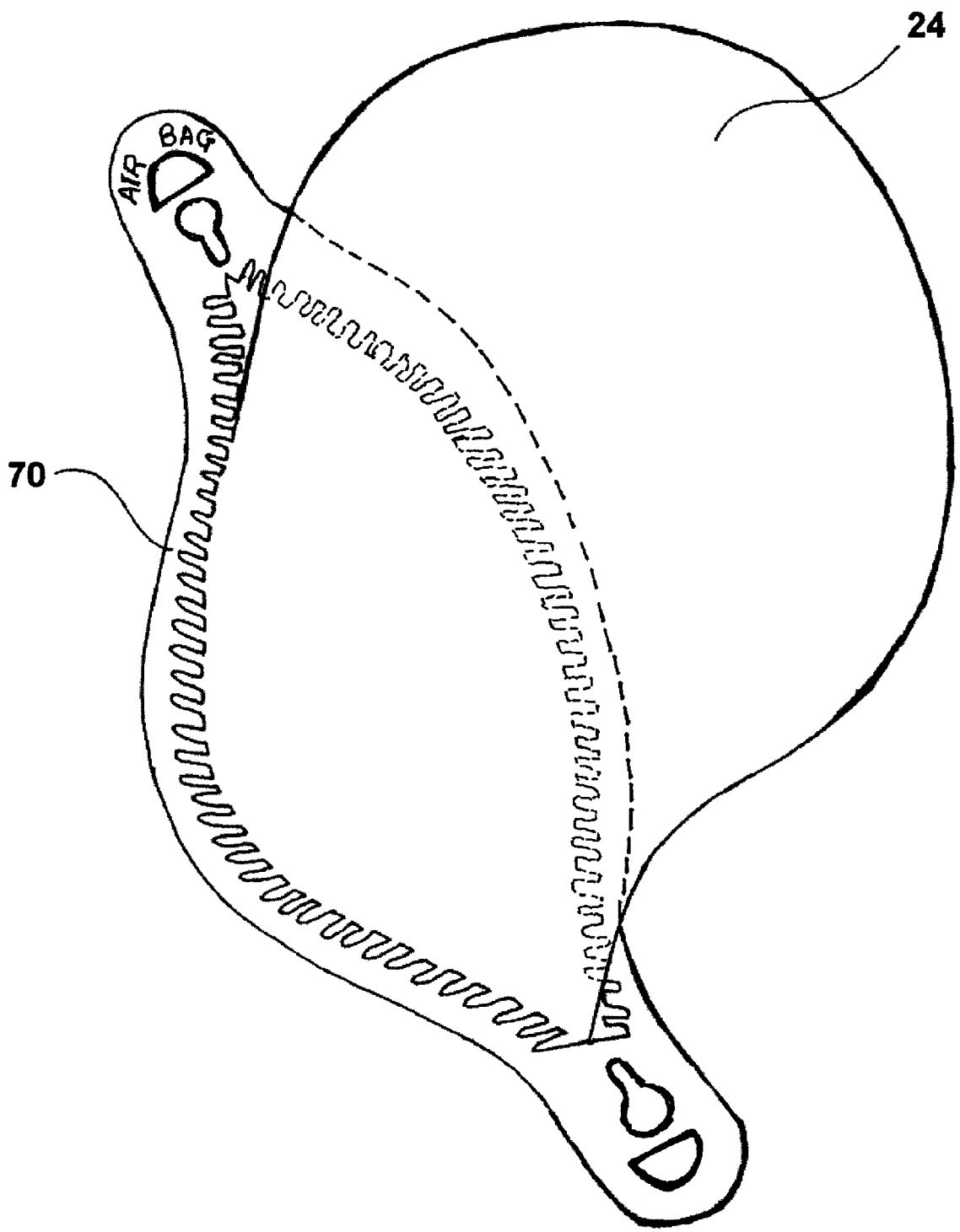
FIG. 5 is a perspective view of an exemplary ruptured adhesive tape with an air bag extending through the rupture.

As further illustrated in FIGS. 3 and 5, the taped adhesive, depending on the desired placement in the seat or the type of seam, may include a weakened portion 80, which is illustrated a variety of perforations 82. The perforations may take on any size, shape or style desired to obtain the desired reduced rupturing force to allow the air bag to rupture the weakened portion and extend through the weakened portion as illustrated in FIG. 5. Of course, the weakened portion may extend the complete longitudinal length allowing complete separation of two halves of the taped adhesive 70, or as illustrated in FIGS. 3 and 5 may be configured to have circumferential extent 86 having strengthened areas, or comparative areas that are not weakened extending about the circumferential extent 86. As part of this, the ends 84 may be strengthened to ensure the rupturing is limited as illustrated in FIG. 5. If desired, the taped adhesive 70 can include a tab 90 identifying that extends beyond the seam 52.

Figure 2:
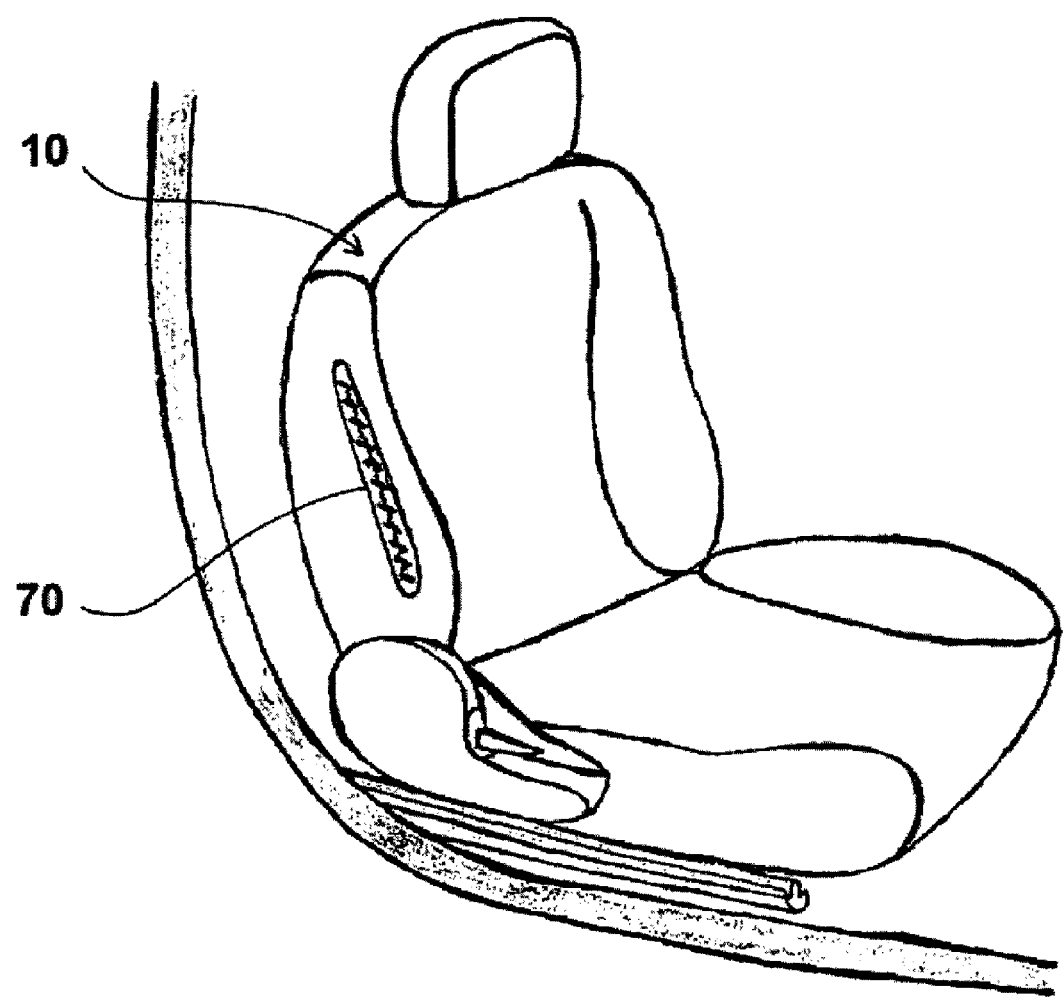
FIG. 2 is a perspective view of an exemplary seat.

As illustrated in FIG. 2, the taped adhesive 70 may be used in portions that are not part of a seam. The opening 34 intersects the panel 50 at a location that is not a seam. While the surface material may have a strength against rupturing that is low enough for the air bag to easily rupture the material, it may be desirable for some materials to score the inner surface of the surface material following the opening 34. To ensure that the material 40 does not rupture unless the air bag 20 is deployed, the taped adhesive 70 may be added to the inner surface 44, such as the taped adhesive illustrated in FIGS. 3 and 5 to better control the rupture of the surface material 40. One benefit of the taped adhesive 70 is that the ends 84 may limit the longitudinal extent of the rupture and thereby provide better direction for deployment of the air bag. The taped adhesive 70 also allows better location control of the rupture on the exit of the surface material.

Figure 6:
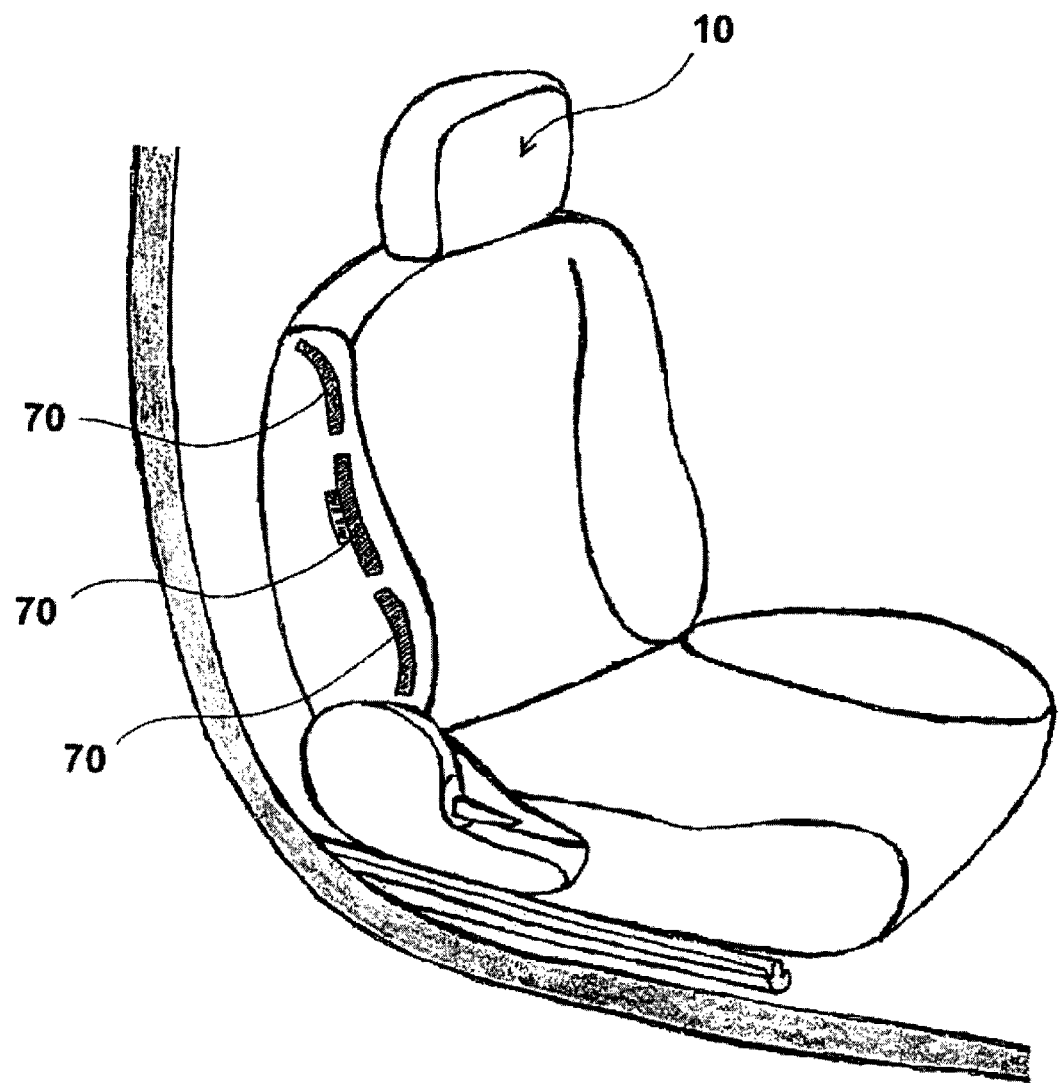
FIG. 6 is a perspective view of a seat illustrating locations of adhesive tape.

As illustrated in FIG. 6, the air bag may include a seam 52 that follows the opening 34 and then extends beyond the opening 34 on each side. The taped adhesive 70 beyond the opening is designed to have greater retention force than the taped adhesive used proximate to the opening 34. While FIG. 6 illustrates the taped adhesive in three parts, with special taped adhesive proximate to the opening, it is possible that the taped adhesive 70 is one continuous piece running the length of the seam 52. To vary the retention force as needed, during manufacturing assembly of the seat, less pressure, heat or a combination thereof may be applied to the seam 52 proximate to the opening 34. This variance allows the retention force to vary along the length of the seam 52 using a single member of taped adhesive 70. Another way to vary the retention force is to apply the pressure and heat for less time, thereby reducing the amount of retention force. Of course, the illustrated seam 52 is only exemplary and may take on other shapes and configurations.

Figure 7A:
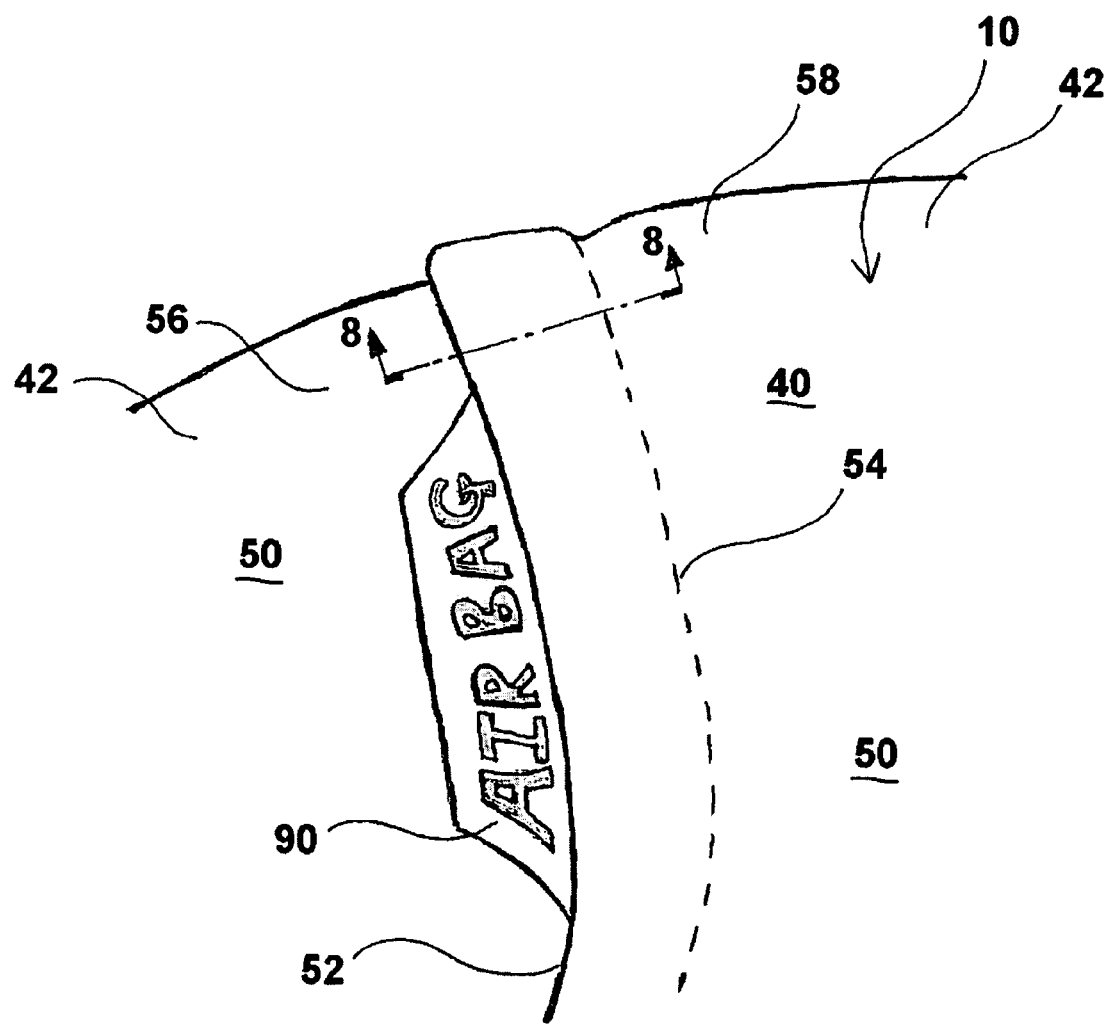
FIG. 7a is a perspective view of an exemplary seam including adhesive tape and an optional identification tag.
Figure 7B:
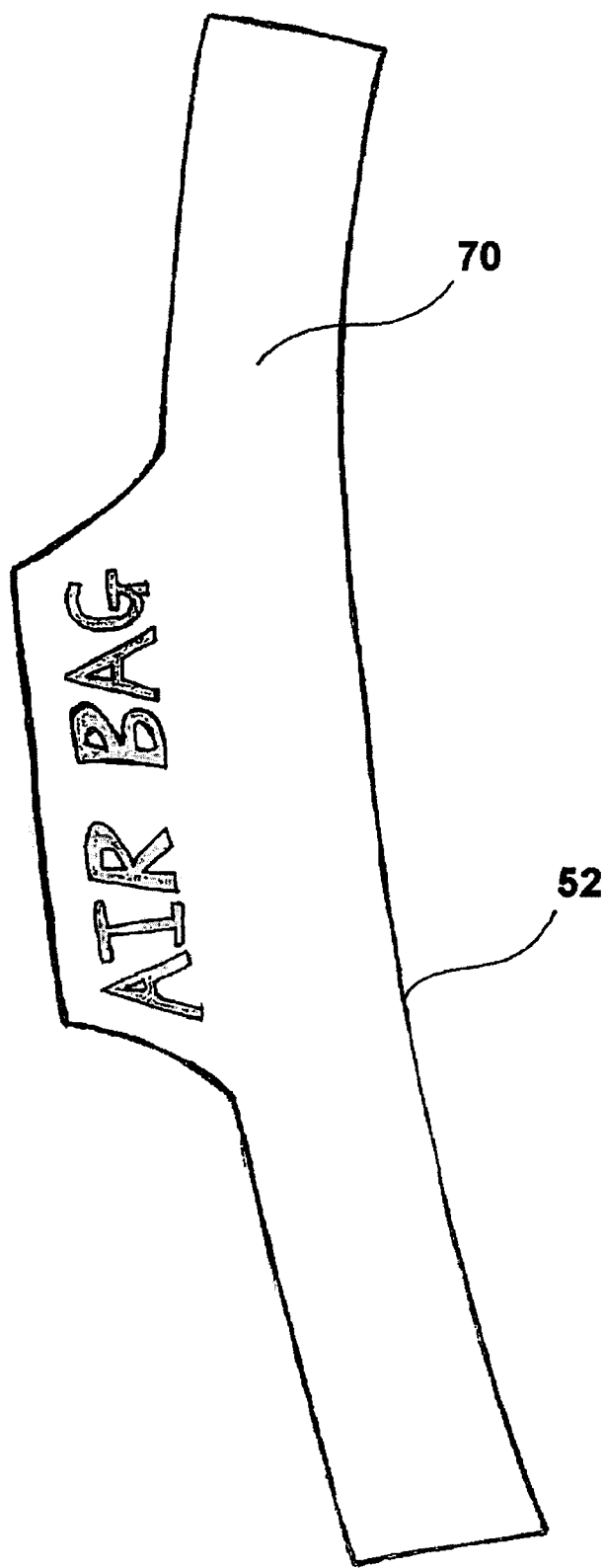
FIG. 7b is a perspective view of a second exemplary seam including adhesive tape and an optional identification tag.
Figure 8:
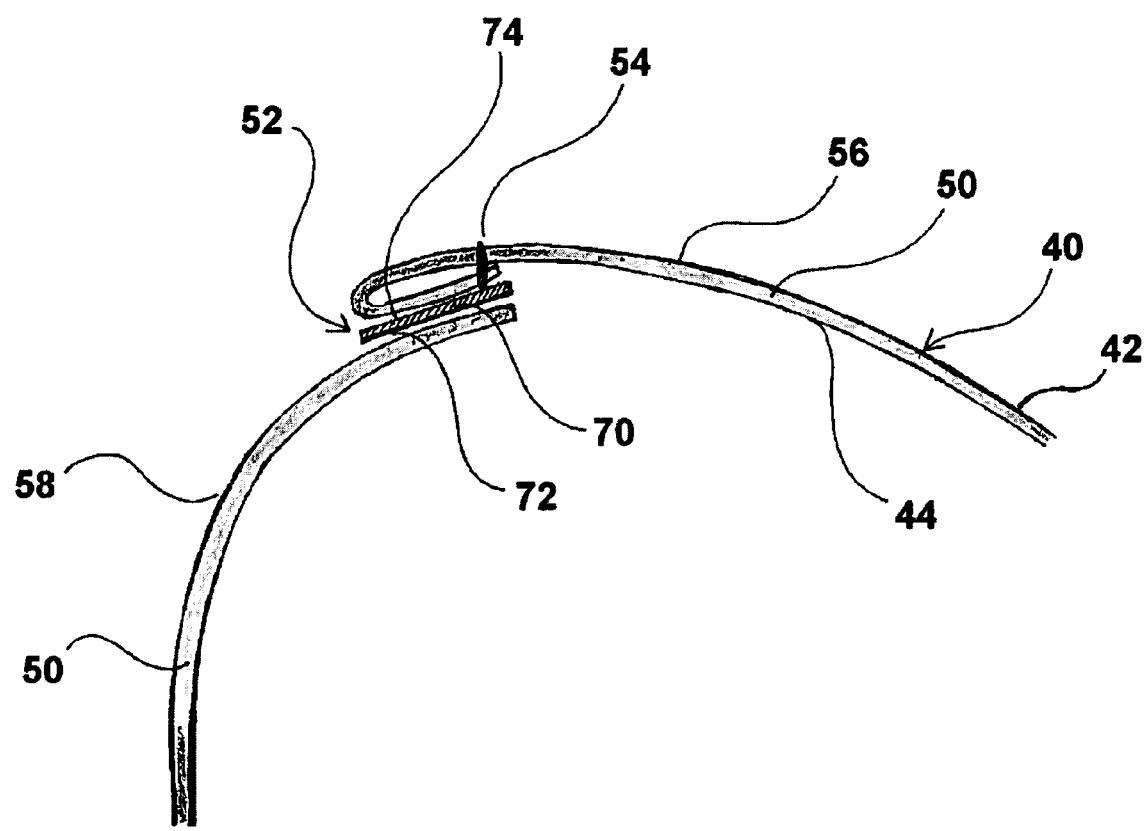
FIG. 8 is a sectional view of FIG. 7 along lines 8-8.

As illustrated in FIGS. 7a and 7b, other types of seams 52 may be used, and the seams may even follow contours of the seat. As further illustrated in FIG. 7a and FIG. 8, the seam while free from stitching to secure the surface materials, may include a decorative stitch, such as a deck sew stitch 54. One other advantage to providing a stitch along the seam, but not part of the seam, leaving the seam to be free of stitching, is to fold over the finish surface 42 of the surface material 20 and as illustrated in FIG. 8 allow two finish surfaces 42 to be bonded together in a stitch or sew free fashion, even though it looks as if it includes stitching. Another advantage to providing the deck sew in conjunction with a stitch free seam is that on some surface materials that inner surface 44 includes a foam backing 46 which is hard to bond to in a secure and reliable fashion with a taped adhesive.

Figure 9:
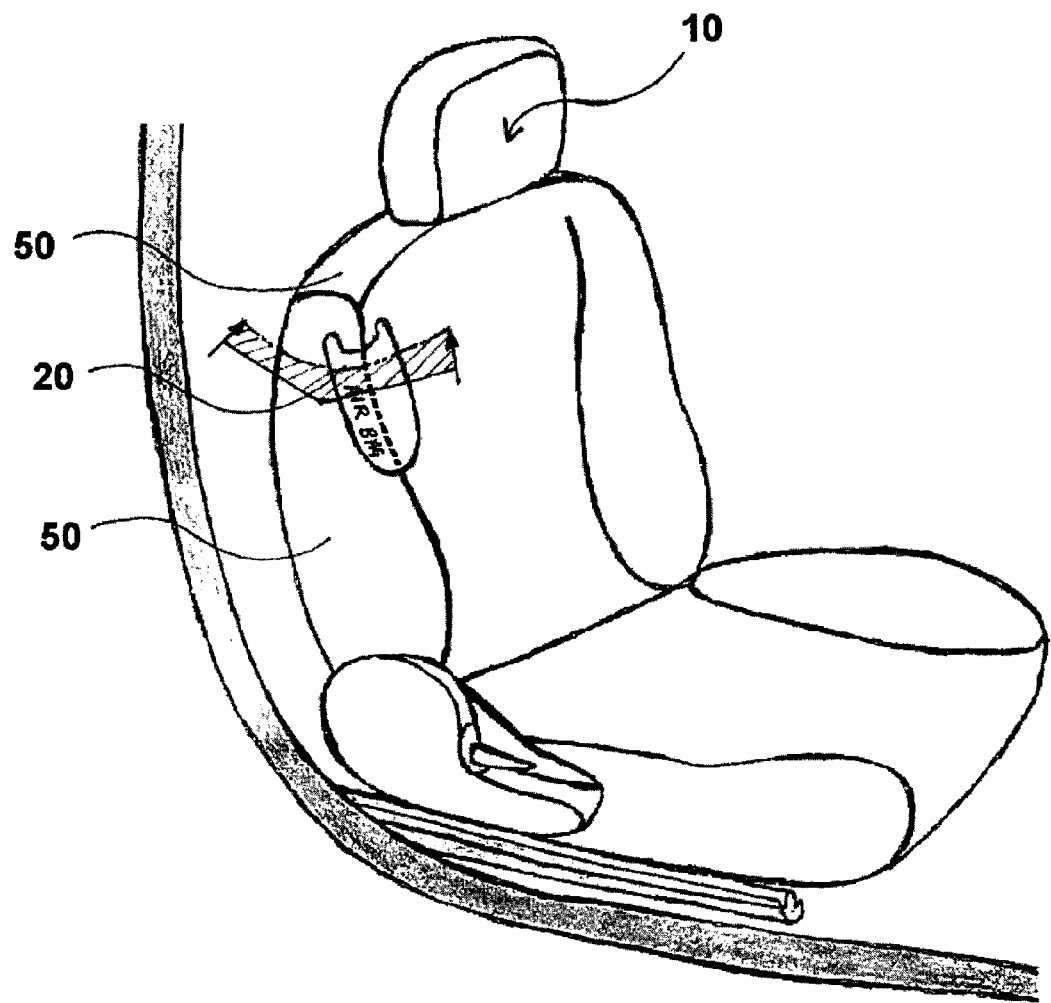
FIG. 9 is perspective view of a seat illustrating an exemplary patch surface material.

FIG. 9 illustrates a seat wherein the complete panel 50 acts as a patch 62 over the opening 34, such that the patch 62 is indistinguishable from the other panels. The patch 62 is attached to the seat using a taped adhesive applied to the inner surface of the surface material 40.

Figure 10:
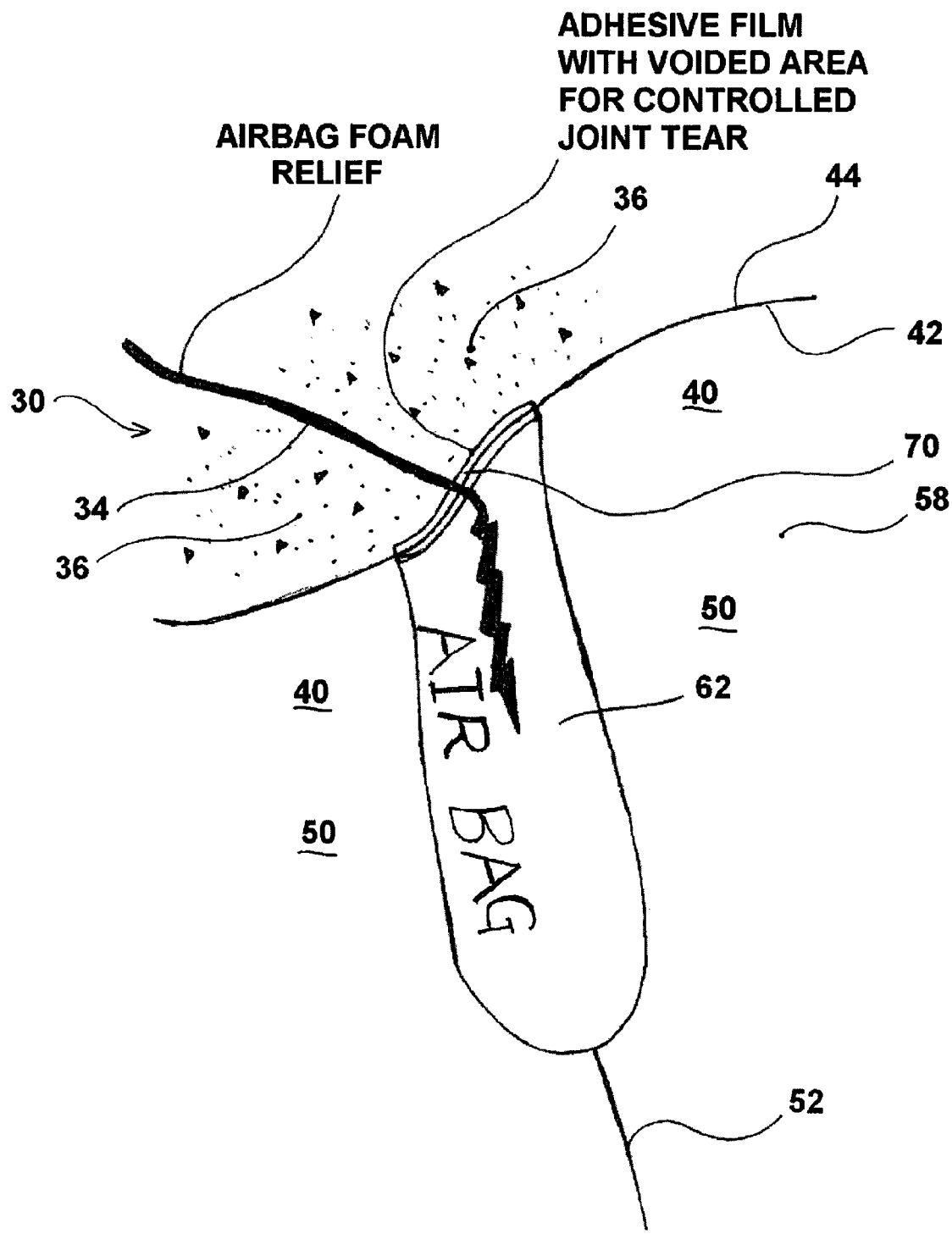
FIG. 10 is partial sectional view of a seat illustrating a an exemplary patch surface material.
Figure 11A:
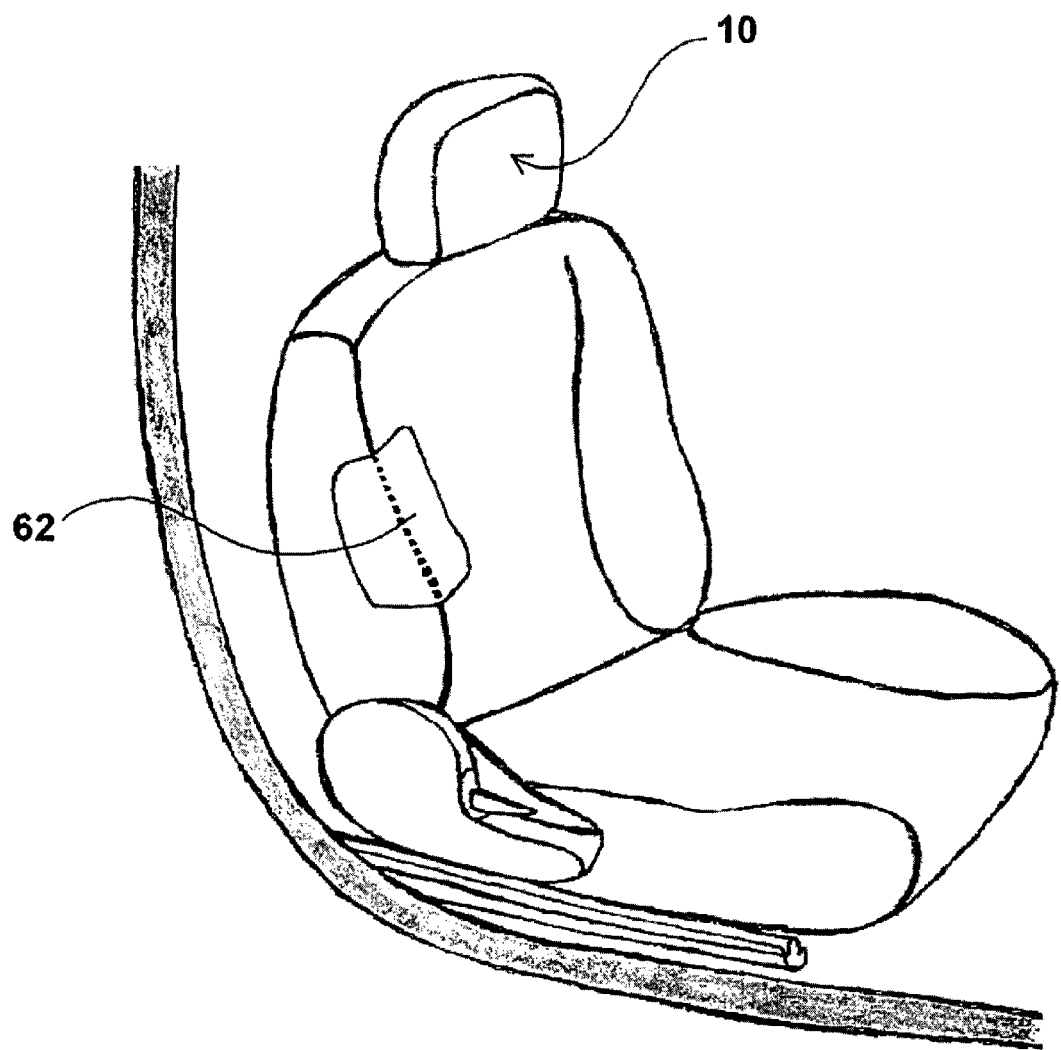
FIG. 11a is a partial sectional view of seat illustrating an exemplary patch surface material.
Figure 11B:
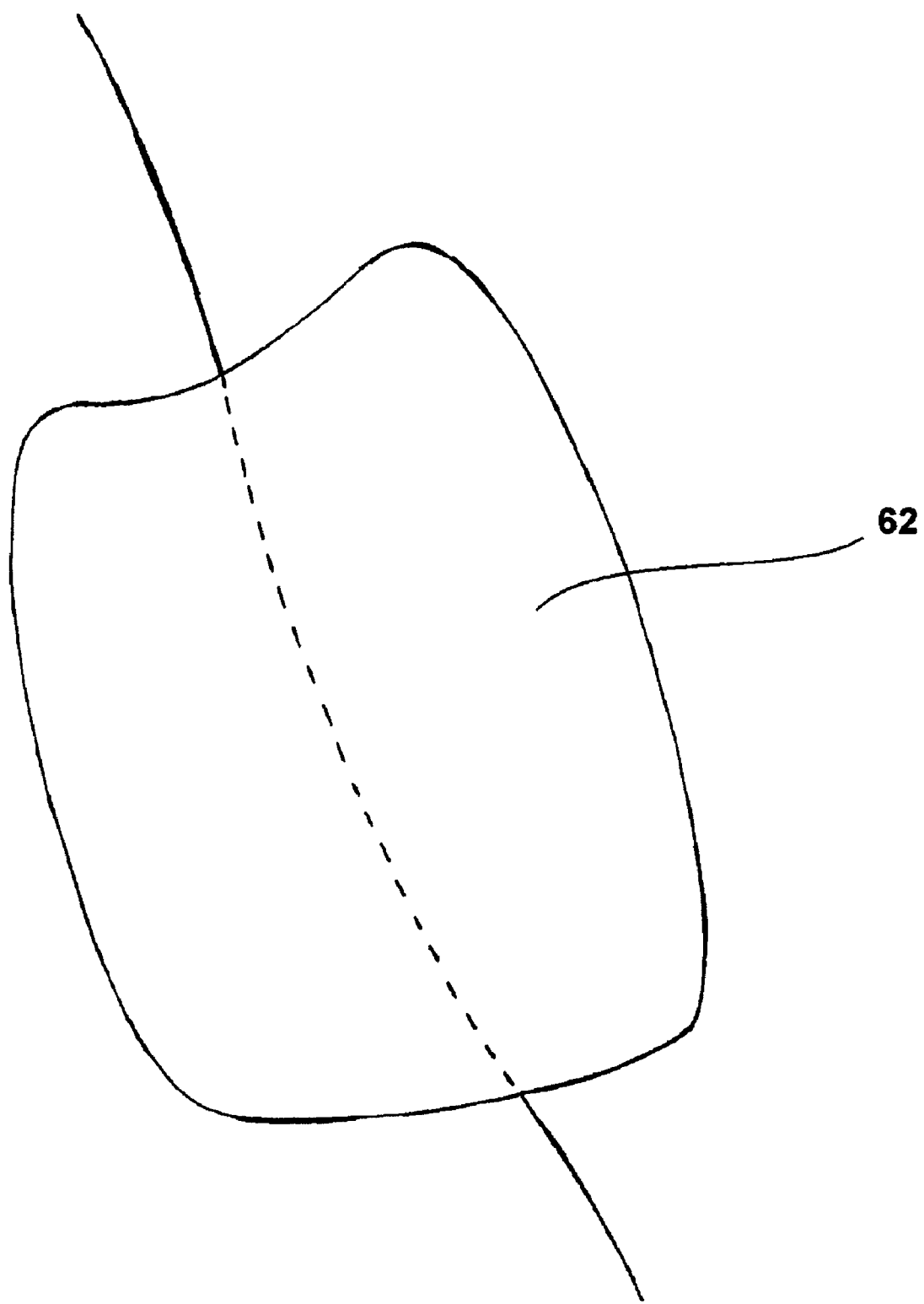
FIG. 11b is a partial sectional view of a seat illustrating an exemplary patch surface material.

FIG. 10 provides a more detailed and partial section view of a smaller patch than what was used in FIG. 9. As illustrated in FIG. 10, the patch 62 may be applied directly over a seam 52 that may be stitched or taped and has an opening aligned with the opening 34 in the cushions. As illustrated in FIG. 10, the patch 62 can be configured to rupture. To control rupture during deployment of the air bag, a taped adhesive similar to that in FIG. 3, but extending the substantially across the inner surface of the patch 62 may be used. Alternatively the patch 62 may be only taped around its outer perimeter with no taped adhesive aligned with the opening 34. In this case the surface material could be configured to rupture or be scored to rupture reliably. FIGS. 11a and 11b provide more detailed illustrations of the various uses for air bag patches 62 as described above. Another view may be seen in FIG. 12 where the patch is applied across the opening 34. The patch may be applied across an unbroken surface or across a seam that follows the opening. Use of a patch 62 across an unbroken surface allows for greater flexibility in repair where the patch can be later applied again across the now broken surface after deployment of the air bag.

Figure 13:
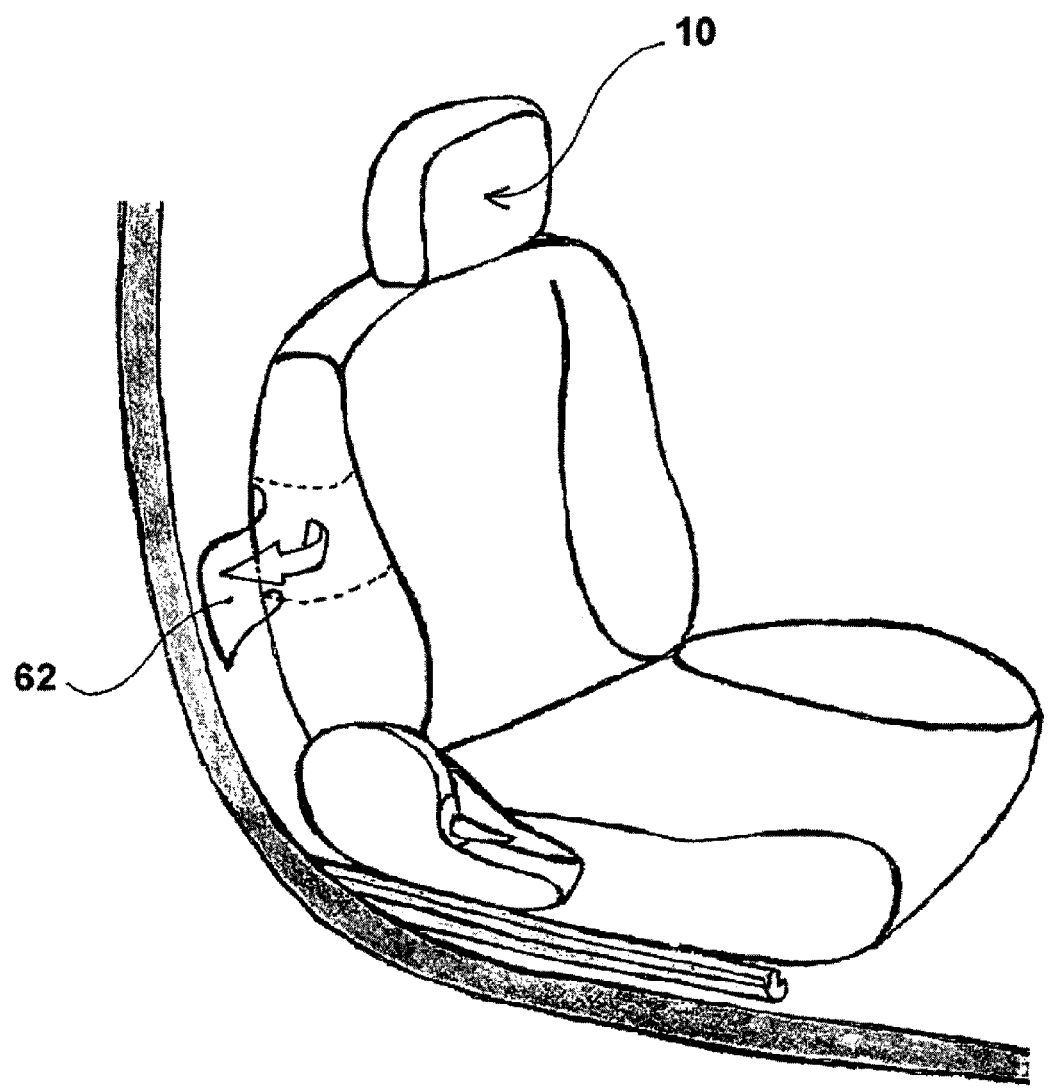
FIG. 13 is a perspective view of seat showing a ruptured patch.

As illustrated in FIG. 13, the patch 62 in place of rupturing may also be configured to act as a flap during deployment. This can easily be accomplished by varying the retention force of the taped adhesive across the longitudinal and lateral extent of the patch 62. More specifically, one method would be to vary the heat and pressure applied to the taped adhesive during application of the patch on each side of the opening, such that one side would have less retention force.

Figure 14:
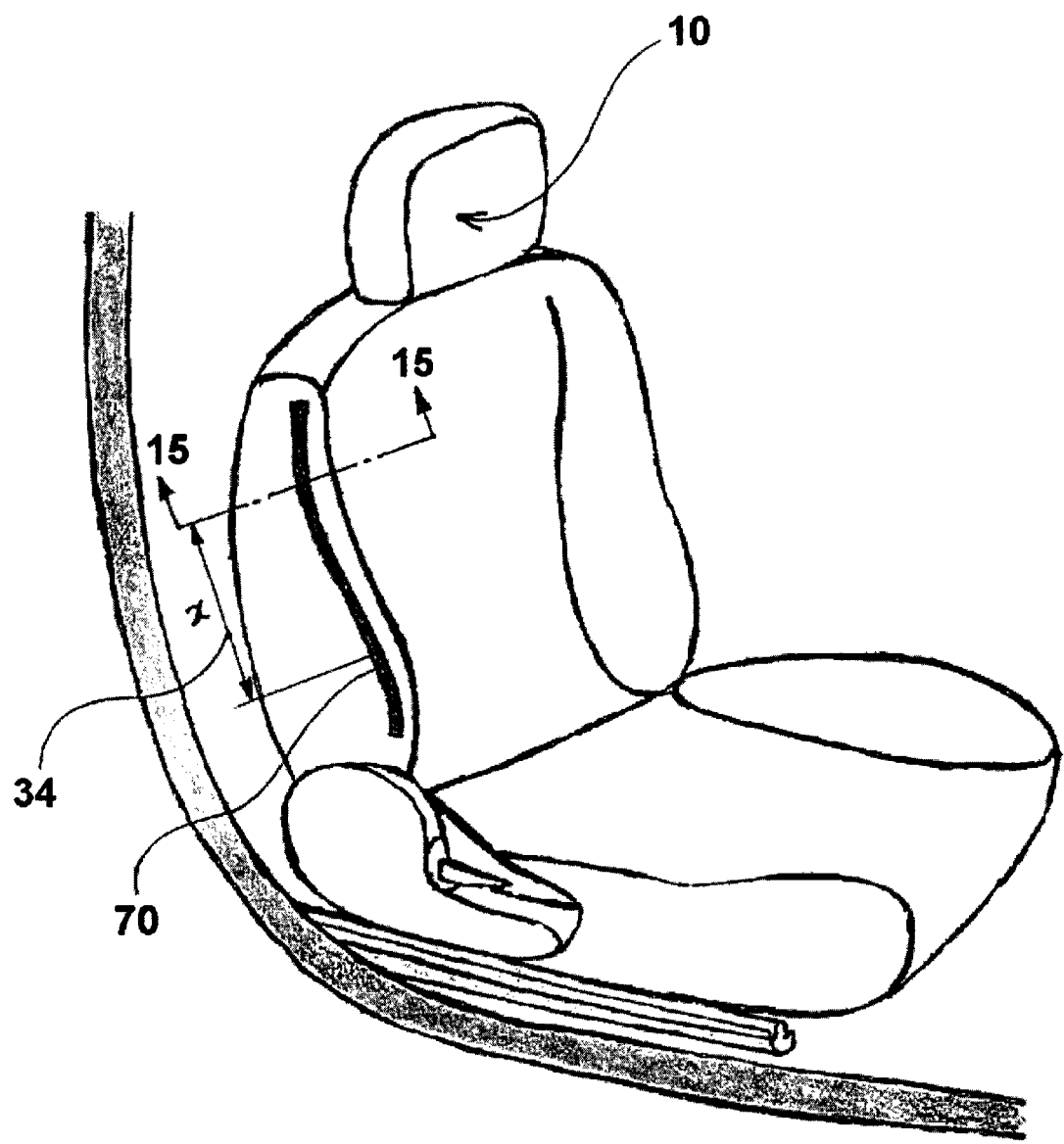
FIG. 14 is a perspective view of an exemplary seat illustrating location of the adhesive tape.
Figure 15:
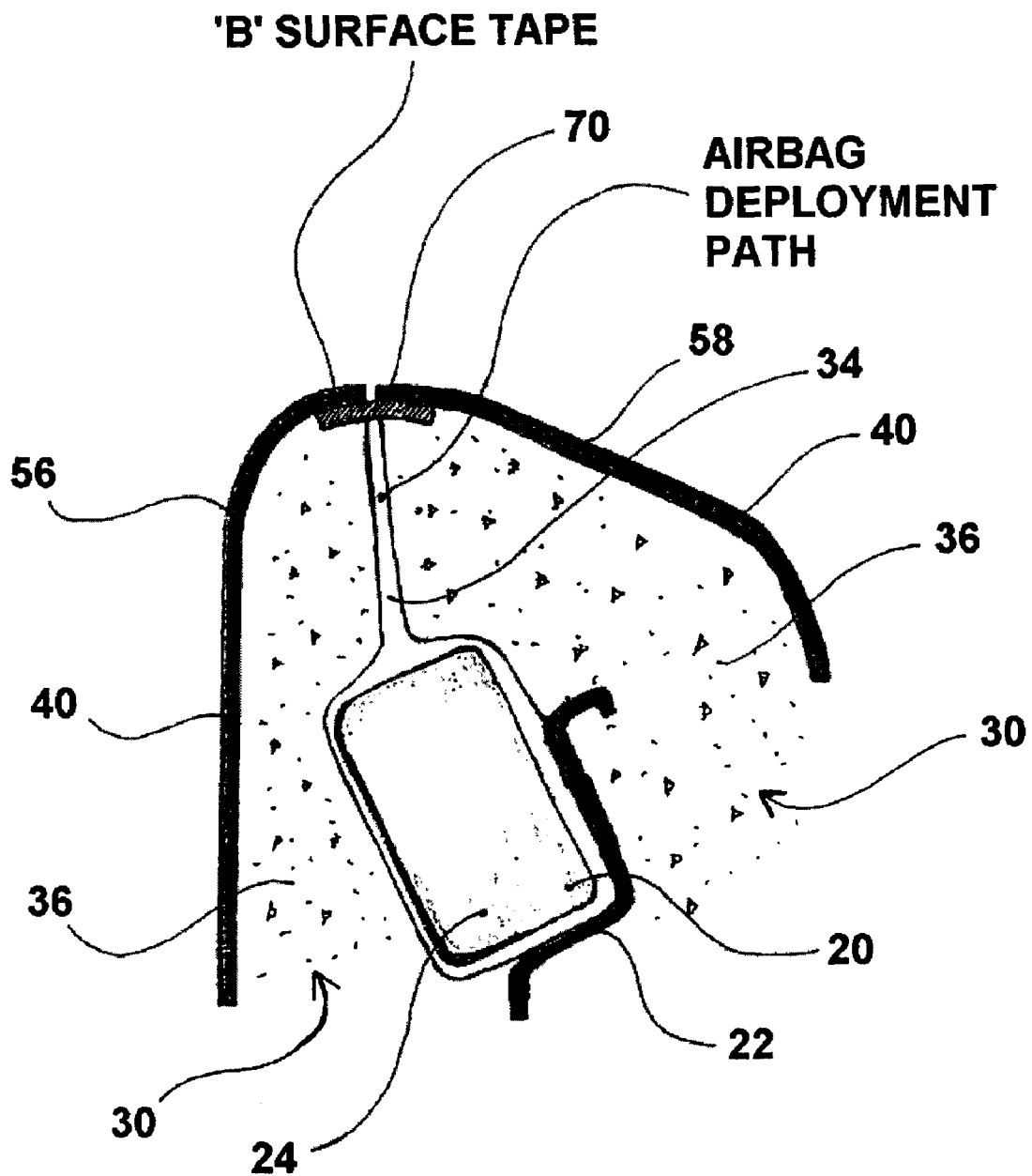
FIG. 15 is a sectional view along lines 15-15 in FIG. 14.

FIGS. 14 and 15 further illustrate a patch being applied to the inner surface 44 of a seam. In this instance, no patch is needed, but instead the taped adhesive itself may act as the patch. The taped adhesive 70 may be similar to that found in FIG. 3.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A seat having an air bag, said seat comprising:
   a cushion portion defining a shape, and an opening in said cushion portion configured to allow the passage of the air bag;
   a surface material having a finish surface and an opposed inner surface, said surface material covering said cushion portion and wherein said surface material forms a seam extending along said opening in said cushion portion and wherein said seam is free from stitching along said opening; and
   a patch of surface material applied with adhesive tape over said seam.

2. The seat of claim 1 wherein said seam includes a first portion of surface material and a second portion surface material joined with an adhesive tape.

3. The seat of claim 2 wherein said adhesive tape is applied to both finish surface on both of the joined first and second surface materials.

4. The seat of claim 3 wherein said adhesive tape is perforated to allow separation of said seam and passage of the air bag.

5. The seat of claim 1 wherein adhesive tape is applied to the inner surface of said surface material across said seam.

6. The seat of claim 5 wherein said adhesive tape includes an area of reduced strength extending along said seam.

7. A seat having an air bag, said seat comprising:
   a cushion portion defining a shape, and an opening in said cushion portion configured to allow the passage of the air bag;
   a surface material having a finish surface and an opposed inner surface, said surface material covering said cushion portion and wherein said surface material forms a seam extending along said opening in said cushion portion and wherein said seam is free from stitching along said opening; and
   a patch of surface material applied with adhesive tape and wherein said adhesive tape has varied retention force across said surface patch.

8. The seat of claim 7 wherein said patch includes a first side and a second side on the opposing side of said seam and wherein one of said first and second sides has less retention force than the other of said first and second sides and said patch is configured to break free of said surface material on said side having less retention force.

9. A seat having an air bag, said seat comprising:
   a cushion portion defining a shape, and an opening in said cushion portion configured to allow the passage of the air bag;
   a surface material having a finish surface and an opposed inner surface, said surface material covering said cushion portion and wherein said surface material forms a seam extending along said opening in said cushion portion and wherein said seam is free from stitching along said opening; and
   wherein said seam includes a portion extending beyond said opening on at least one side and wherein said seam extending beyond said opening is substantially free of stitching.

10. The seat of claim 9 wherein said portion of said portion extending beyond said opening is joined with a first taped adhesive having a first retention force.

11. The seat of claim 10 wherein said portion of said seam extending along said opening is joined with a second taped adhesive having a second retention force and wherein said first retention force is greater than said second retention force.

12. The seat of claim 11 wherein said seam is joined with a single taped adhesive and wherein said taped adhesive along said opening has less retention force then said taped adhesive along said portion extending beyond said opening.

13. The seat of claim 12 wherein said retention force is varied by differing the amount of heat, pressure or application time of heat and pressure applied to the seam along said opening and the portion extending beyond said opening.

14. The seat of claim 1 wherein said seam includes a taped adhesive having a weakened area.

15. The seat of claim 14 wherein said weakened area is perforated.

16. The seat of claim 15 wherein said weakened area is bounded by reinforced areas.

17. The seat of claim 16 wherein said bounded areas are configured to limit rupturing of said weakened area to a defined opening.

18. The seat of claim 14 wherein said taped adhesive includes a tab that extends visibly outward of the seam.

* * * * *